United States Patent [19]

Muggli et al.

[11] Patent Number: 4,506,161

[45] Date of Patent: Mar. 19, 1985

[54] SMOKE DETECTOR WITH A RADIATION SOURCE OPERATED IN A PULSE-LIKE OR INTERMITTENT MODE

[75] Inventors: Jürg Muggli; Heinz Güttinger, both of Männedorf, Switzerland

[73] Assignee: Cerberus AG, Männedorf, Switzerland

[21] Appl. No.: 386,247

[22] Filed: Jun. 8, 1982

[30] Foreign Application Priority Data

Jun. 15, 1981 [CH] Switzerland ........................ 3926/81

[51] Int. Cl.[3] ............................................ G01H 15/06

[52] U.S. Cl. .................................... 250/574; 340/630

[58] Field of Search ............... 356/338, 436, 437, 438, 356/439; 340/630, 556, 557; 250/574, 573, 221

[56] References Cited

U.S. PATENT DOCUMENTS

| | | | |
|---|---|---|---|
| 3,846,773 | 11/1974 | Lintelmann | 340/237.5 |
| 3,922,656 | 11/1975 | Horvath et al. | 250/573 |
| 4,260,984 | 4/1981 | Honma | 250/574 |
| 4,297,688 | 10/1981 | Kakigi | 250/574 |
| 4,321,595 | 3/1982 | Tresch | 250/574 |

FOREIGN PATENT DOCUMENTS

| | | | |
|---|---|---|---|
| 0011205 | 5/1980 | European Pat. Off. | 340/630 |
| 1082973 | 9/1967 | United Kingdom | 340/215 |
| 2003601 | 3/1979 | United Kingdom | 340/272 |
| 2090970 | 7/1982 | United Kingdom | 340/630 |

OTHER PUBLICATIONS

"Electronics"—Optoelectronic Alarm Circuit is Time-sensitive, by Forrest M. Mims III, vol. 52, No. 14, p. 133, Jul. 1979.

*Primary Examiner*—David C. Nelms
*Assistant Examiner*—James Gatto
*Attorney, Agent, or Firm*—Werner W. Kleeman

[57] ABSTRACT

A smoke detector contains a pulse-operated radiation source and a radiation receiver arranged externally of the region directly irradiated by the radiation source. The radiation receiver, in the presence of smoke in the radiation region, is impinged by scattered radiation and delivers output pulses. There is provided an evaluation circuit which generates a blocking pulse, and which inputs a resetting signal to a counter device in consequence of the difference of the blocking pulse and output pulse of the radiation receiver. The counter or counting device, in the absence of a resetting signal, is switched further and upon reaching a predetermined counter state triggers an alarm signal. High-frequency electrical disturbances which arise, as long as the radiation source delivers radiation pulses, at most can generate an additional resetting signal for the counter, so that the integrity of the smoke detector against triggering of false alarms is enhanced. If there is connected in parallel to the radiation receiver a NTC-resistor, then there is obtained a smoke detector which responds to a further combustion criterion (temperature).

14 Claims, 3 Drawing Figures

SMOKE DETECTOR WITH A RADIATION SOURCE OPERATED IN A PULSE-LIKE OR INTERMITTENT MODE

BACKGROUND OF THE INVENTION

The present invention relates to a new and improved construction of a smoke detector having pulse-operated or intermittently operated radiation source.

Generally speaking, the smoke detector of the present development is of the type wherein a radiation receiver is arranged externally of the region directly irradiated by the radiation source. This radiation receiver, in the presence of smoke in the radiation region, is impinged by scattered radiation and delivers output pulses. Additionally, there is provided an evaluation circuit which contains switching elements which, when the output pulses exceed a predetermined threshold during a predetermined number of pulses, transmits a signal to a trigger or switching stage for delivering an alarm signal.

Such type of smoke detector is known to the art from Swiss Pat. No. 417,405 and the corresponding U.S. Pat. No. 3,316,410, granted Apr. 25, 1967. With such prior art smoke detector a radiation source is controlled by a pulse transmitter and transmits briefly lasting radiation pulses. The evaluation circuit connected with the scattered radiation receiver is controlled by the pulse transmitter of the radiation source in such a manner that, upon reception of scattered radiation only during the pulse phases of the radiation source, is it capable of delivering an output signal. Spurious pulses which arise between the radiation pulses are therefore blocked in the evaluation circuit and cannot lead to triggering of an alarm signal. What is disadvantageous with this equipment design is that spurious pulses which happen to occur during the same time as the radiation pulses can nonetheless trigger a faulty alarm signal.

To avoid this shortcoming it has already been proposed to connect an integrator or counter in circuit after such smoke detector which operates in coincidence. This has been described in detail, for instance, in Swiss Pat. No. 580,848 and the corresponding U.S. Pat. No. 3,946,241, granted Mar. 23, 1976. Notwithstanding these measures such type of smoke detector can still trigger false alarms in the presence of rapid successively occurring disturbances, such as those caused, for instance, by high-frequency electromagnetic radiation.

Furthermore, a scattered light smoke detector operating in coincidence is known from European patent application No. 14,779. Here, the evaluation circuit contains a counter device or counter which counts both the radiation source pulses and also the output pulses of the radiation receiver and whenever there prevails an uneven counter state following a random radiation pulse the counter is reset to null, however upon reaching a predetermined even counter state there is triggered a signal. However, also with this smoke detector there is not precluded the occurrence of spurious or false alarms, since in the presence of high-frequency electromagnetic disturbances during each pulse there can be generated a spurious pulse. Additionally, the circuit is complicated in design and therefore less reliable in operation.

A further problem existing with the previously described type of smoke detectors resides in the temperature-dependency of the radiation transmitter. In the case of optical smoke detectors, wherein there is used a projection lamp as the light source, the temperature-compensation can be accomplished through the use of a thermistor. Significant in this regard is the smoke detector disclosed in British Pat. No. 1,172,354, published Nov. 26, 1969.

With most of the employed semiconductor elements the transmitted radiation markedly decreases with increasing temperature. Attempts have been made to compensate such radiation decrease in that there is connected a NTC-resistor (negative temperature coefficient-resistor) in series with a light-emitting diode (LED) Motorola, European MOS Selection 1979, 9-334). However, the resistance values of the NTC-resistor tend to vary to such a great extent that the thus obtained compensation is not adequate.

SUMMARY OF THE INVENTION

Therefore, with the foregoing in mind it is a primary object of the present invention to provide a new and improved construction of smoke detector having a radiation source operated in a pulse-operated or intermittent mode, which is not associated with the aforementioned drawbacks and limitations of the prior art proposals.

Another and more specific object of the present invention aims at eliminating the previously discussed drawbacks of the state-of-the-art smoke detectors, and, in particular, providing a new and improved construction of smoke detector wherein there is precluded any delivery of a faulty signal as a consequence of electrical disturbances, at the same time there is improved upon the reduction in the smoke sensitivity at elevated temperature and which is caused by the temperature-dependency of the radiation source.

A further important object of the present invention is directed to a new and improved construction of smoke detector having an intermittently operated or pulsed radiation source, and wherein such smoke detector is relatively simple in construction and design, extremely economical to manufacture, highly reliable in operation, not readily subject to breakdown or malfunction, and requires a minimum or maintenance and servicing.

Now in order to implement these and still further objects of the invention, which will become more readily apparent as the description proceeds, the smoke detector of the present development is manifested by the features that there are provided means which generate electrical blocking pulses, and that there are provided additional means for inputting as a resetting or reset signal to a counter device the difference of the blocking pulses and output pulses of the radiation receiver. Also, there are provided means which further switch the counter upon absence of the resetting or reset signal and upon reaching a predetermined counter state of the counter transmit the signal further to a switching or trigger stage.

According to one construction of the inventive smoke detector there is provided an oscillator for the current supply of the radiation source, and an amplifier is provided for amplifying the output pulses of the radiation receiver. The blocking pulses are generated by electrical pulses of the oscillator and are conducted by the amplifier with reverse sign. A threshold detector is connected in circuit after the amplifier. This threshold detector evaluates the difference between the blocking pulses and the output pulses of the radiation receiver. In the absence of smoke this difference is so great that the threshold detector is actuated, and thus, there is triggered a resetting or reset pulse for the counter. However, if smoke is present in the smoke measuring chamber of the smoke detector then this difference becomes smaller and the resetting pulse is suppressed.

A high-frequency electrical disturbance which arises, as long as the radiation source delivers radiation pulses, therefore at most can generate an additional reset signal for the counter. The operational integrity of the smoke detector against triggering false alarms in therefore enhanced.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
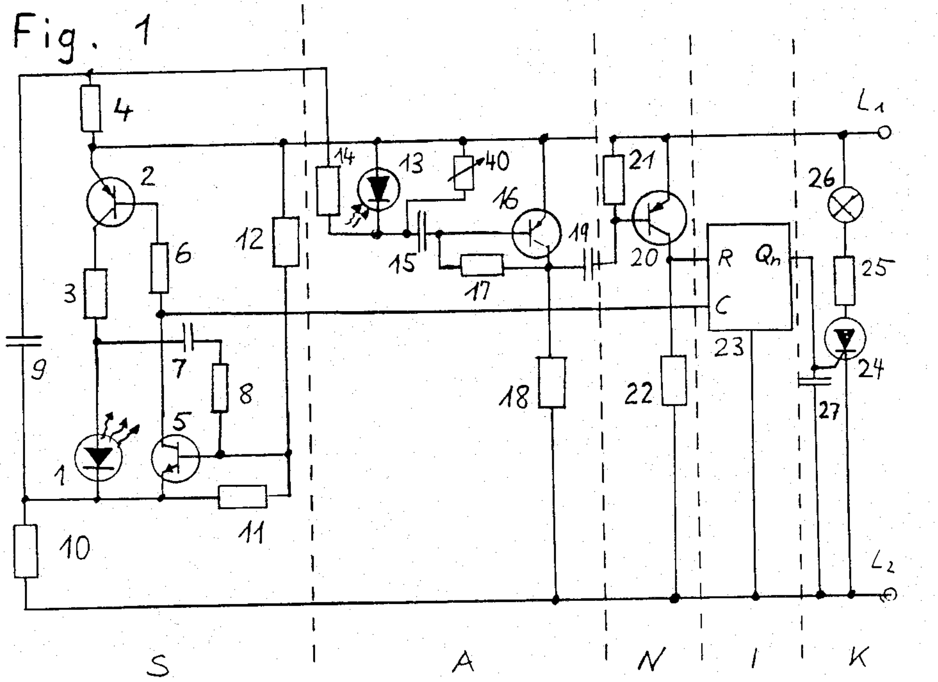
FIG. 1 is a circuit diagram of a preferred embodiment of smoke detector according to the invention.

Describing now the drawings, in the circuit arrangement of the exemplary embodiment of smoke detector as shown in FIG. 1, there are arranged between two lines or conductors $L_1$ and $L_2$ carrying a direct-current voltage, a radiation transmitter S, a radiation receiver A, a threshold value detector or threshold detector N, an integration stage I, and an alarm stage K constructed as a switching or trigger stage.

The radiation transmitter S comprises an oscillator which approximately every 2 seconds conducts a current in the order of about 1 ampere for approximately 100 microseconds through the radiation source 1 composed of, for instance, a suitable diode, such as a light-emitting diode or infrared radiation-emitting diode. A power transistor 2 switches-on this current which is limited by the resistors or resistances 3 and 4. The transistor 2 is controlled by a transistor 5 by means of the limiter resistor 6. A capacitor 7 and resistor 8 form a positive feedback of the oscillator. The large capacitor 9 delivers a current pulse and is again charged by the resistor 10. The pulse is released as soon as the resistors 11 and 12 apply a potential to the base of the transistor 5, which then turns-on or enables the transistors 2 and 5.

The radiation receiver or radiation pick-up stage A amplifies the negative received signal of the radiation receiver 13 and the positive blocking signal appearing at the resistor 4 which is attenuated by the resistor 14, by means of the coupling capacitor 15, the transistor 16 and the feedback resistor 17. Additionally, the amplifier contains a collector resistor 18 and a coupling capacitor 19. The subsequently connected threshold detector N consists of the transistor 20, the base resistor 21 and the collector resistor 22.

The integration stage I here consists of a counter device or counter 23. This counter 23 receives a counting signal during each pulse from the resistor 6. In the event that the negative difference between the blocking pulse and received pulse is large enough, then the threshold detector N generates a resetting or reset signal which resets the counter 23 by at least one unit. The switching elements for resetting the counter 23 can also be structured such that such counter 23 is reset to null. After $2^{n-1}$ pulses, during which there is not generated any resetting pulse, $Q_n$ goes from logic state 0 to 1 and therefore generates an alarm pulse.

The switching or trigger stage K consists of a thyristor 24 which is controlled by an alarm pulse from the counter 23, a limiting or limiter resistor 25, a lamp or LED 26, and a delay capacitor 27 which ensures that the firing of the thyristor 24 is delayed by at least the duration of the transmitted pulse following the alarm pulse.

The circuit ensures that, similar to the circuitry of the aforementioned European patent application No. 14,779, there are required a certain number of successive pulses having sufficiently high output pulse of the radiation receiver 13, in order to activate or fire the switching stage K. If there is absent even one pulse then the counter 23 is again reset. Electrical disturbances which are received by the receiver cell or receiver generally can only produce a resetting pulse, and thus, cannot produce any faulty or spurious alarm signal.

The reduction in the light output of the LED 1 with increased temperature is compensated in the following manner. In the presence of an increased temperature the base-emitter voltage at the transistor 5, by means of which there is initiated the transmitting pulse, becomes smaller. Because of the voltage divider action brought about by the resistors 11 and 12 this means that the voltage at the capacitor 9 during the start of the pulse becomes smaller with elevated temperature. The blocking pulse at the resistor 4 therefore becomes smaller. The difference between the blocking pulse and the received pulse therefore becomes smaller, so that there is only needed a smaler output pulse of the radiation receiver for suppressing the resetting signal.

Figure 2:
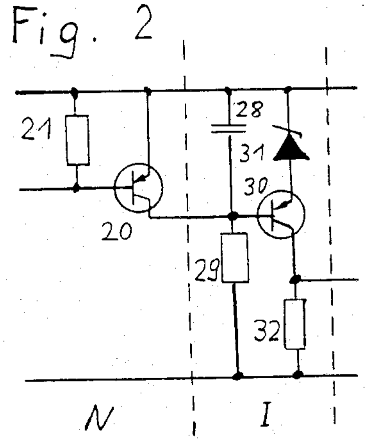
FIG. 2 illustrates an embodiment wherein the counter is replaced by an integrator (capacitor)
Figure 3:
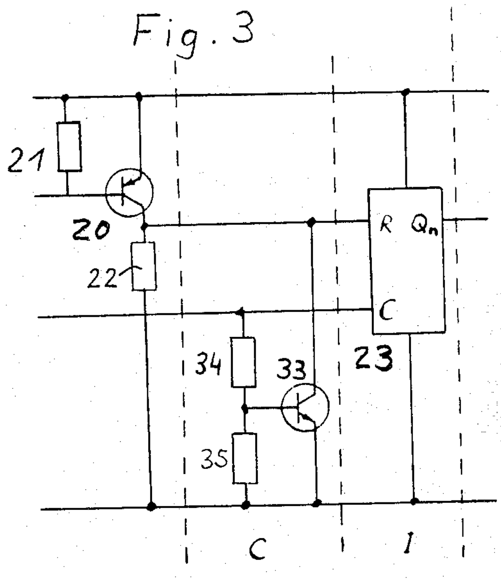
FIG. 3 illustrates a further embodiment wherein a correlation element is provided between the threshold detector and integrator.

Of course, it should be understood that it is possible to replace the counter 23 by an integrator (capacitor), as the same has been illustrated for the circuitry of FIG. 2. The capacitor 28 is thus charged across the resistor 29. As soon as it has been sufficiently charged the transistor 30 along with the Zener diode 31 and the resistor 32 are turned-on and there is activated the switching stage K. The circuit can be made even more secure against disturbances if there is connected between the threshold detector N and the integrator I a correlation element C, as the same has been shown for the circuit design of FIG. 3. Such consists of, for instance, the transistor 33 and the resistors 34 and 35. The voltage at the clock input of the counter 23 is normally high, and thus, the transistor 33 is conductive, so that the resetting input R of the counter 23 is blocked or disabled. Only during a pulse is there blocked or rendered non-conductive the transistor 33, so that only then can there be received a resetting pulse. Due to this circuit design the smoke detector is rendered more operationally reliable in giving or triggering an alarm in the presence of smoke.

Also, with the circuits of the invention it is possible to construct in a most simple manner a smoke detector which becomes more sensitive with rapidly ascending temperature and wherein an alarm signal is delivered also without the presence of smoke in the presence of a certain temperature. To this end it is possible to connect a NTC-resistor 40 parallel to the radiation receiver 13. This NTC-resistor preferably protrudes out of the outer casing of the smoke detector and therefore can thermally rapidly respond. The NTC-resistor has a smaller resistance at elevated temperatures and therefore reduces the blocking pulse. As soon as this pulse is small enough then there is no longer generated any resetting pulse, and thus, an alarm signal is produced.

While there are shown and described present preferred embodiments of the invention, it is to be distinctly understood that the invention is not limited thereto, but may be otherwise variously embodied and practiced within the scope of the following claims. Accordingly,

What we claim is:

1. A smoke detector comprising:

a pulse-operated radiation source;

a radiation receiver arranged externally of a region directly irradiated by the radiation source;

said radiation receiver in the presence of smoke in the radiation region being impinged by scattered radiation and delivering output pulses;

an evaluation circuit containing switching elements;

a switching stage operatively connected with said switching elements;

said switching elements, when said output pulses exceed a predetermined threshold during a predetermined number of pulses, delivering a signal to said switching stage for the purpose of delivering an alarm signal;

means for generating electrical blocking pulses;

a counter;

means for infeeding, by virtue of the difference between said blocking pulses and said output pulses of the radiation receiver, a reset signal to the counter; and means for further switching the counter upon the absence of the reset signal and, upon obtaining a predetermined counter state of the counter, further conducting the signal to the switching stage.

2. The smoke detector as defined in claim 1, further comprising:

an oscillator for supplying current for the radiation source and delivering electrical pulses;

an amplifier for amplifying the output pulses of the radiation receiver;

the electrical pulses of said oscillator generating the blocking pulses;

said blocking pulses and the output pulses of the radiation receiver being inputted to a common input of the amplifier; and said amplifier performing a difference formation between the blocking pulses and the output pulses of the radiation receiver.

3. The smoke detector as defined in claim 1, further including:

a differential amplifier for amplifying the output pulses of the radiation receiver; and the output pulses of the radiation receiver and the blocking pulses are inputted to different inputs of the differential amplifier.

4. The smoke detector as defined in claim 1, further including:

said switching elements contain means which, upon the difference of the blocking pulses and output pulses of the radiation receiver exceeding a certain predetermined value, generate a reset signal which resets the counter state of the counter by at least one unit.

5. The smoke detector as defined in claim 1, further comprising:

switching elements by means of which the counter state at which there is delivered a signal can be selectively set.

6. The smoke detector as defined in claim 1, wherein:

said counter is structured such that at a counter state of four there is delivered a signal.

7. The smoke detector as defined in claim 4, wherein:

said means for generating a reset signal are structured such that they reset the counter state of the counter to null.

8. The smoke detector as defined in claim 1, further including:

said switching elements contain means which, upon the magnitude of the difference of the blocking pulses and output pulses of the radiation receiver exceeding a predetermined value, generate a reset signal;

a capacitor which is substantially uniformly charged;

said reset signal discharging said capacitor; and said capacitor, upon reaching a predetermined charging state, triggering a signal.

9. The smoke detector as defined in claim 8, wherein:

the charging time of the capacitor amounts to at least two pulse intervals.

10. The smoke detector as defined in claim 4, further including:

a correlation element which is structured such that the reset signal only can reset the counter as long as the radiation source delivers radiation pulses.

11. The smoke detector as defined in claim 2, wherein:

a NTC-resistor is connected in parallel with the radiation receiver.

12. The smoke detector as defined in claim 11, wherein:

said NTC-resistor is arranged externally of a housing of the smoke detector.

13. The smoke detector as defined in claim 12, wherein:

said NTC-resistor is structured such that upon attaining a predetermined temperature the blocking pulses are so small that even without penetration of smoke into the smoke detector a signal is delivered by the counter to the alarm stage.

14. The smoke detector as defined in claim 13, wherein:

said predetermined temperature is in a range of 5° C. to 80° C.

* * * * *

UNITED STATES PATENT AND TRADEMARK OFFICE

CERTIFICATE OF CORRECTION

PATENT NO. : 4,506,161

DATED : March 19, 1985

INVENTOR(S) : JüRG MUGGLI et al

It is certified that error appears in the above—identified patent and that said Letters Patent is hereby corrected as shown below:

Column 6, penultimate line, please delete "5°C" and replace it with --50°C--.

Signed and Sealed this

*Sixteenth* Day of *July 1985*

[SEAL]

*Attest:*

DONALD J. QUIGG

*Attesting Officer* *Acting Commissioner of Patents and Trademarks*